No. 895,782. PATENTED AUG. 11, 1908.
I. NEWELL.
WATER COOLER.
APPLICATION FILED SEPT. 26, 1905.

2 SHEETS—SHEET 1.

Inventor
Isaiah Newell

Witnesses

By
Attorney

No. 895,782. PATENTED AUG. 11, 1908.
I. NEWELL.
WATER COOLER.
APPLICATION FILED SEPT. 26, 1903.
2 SHEETS—SHEET 2.
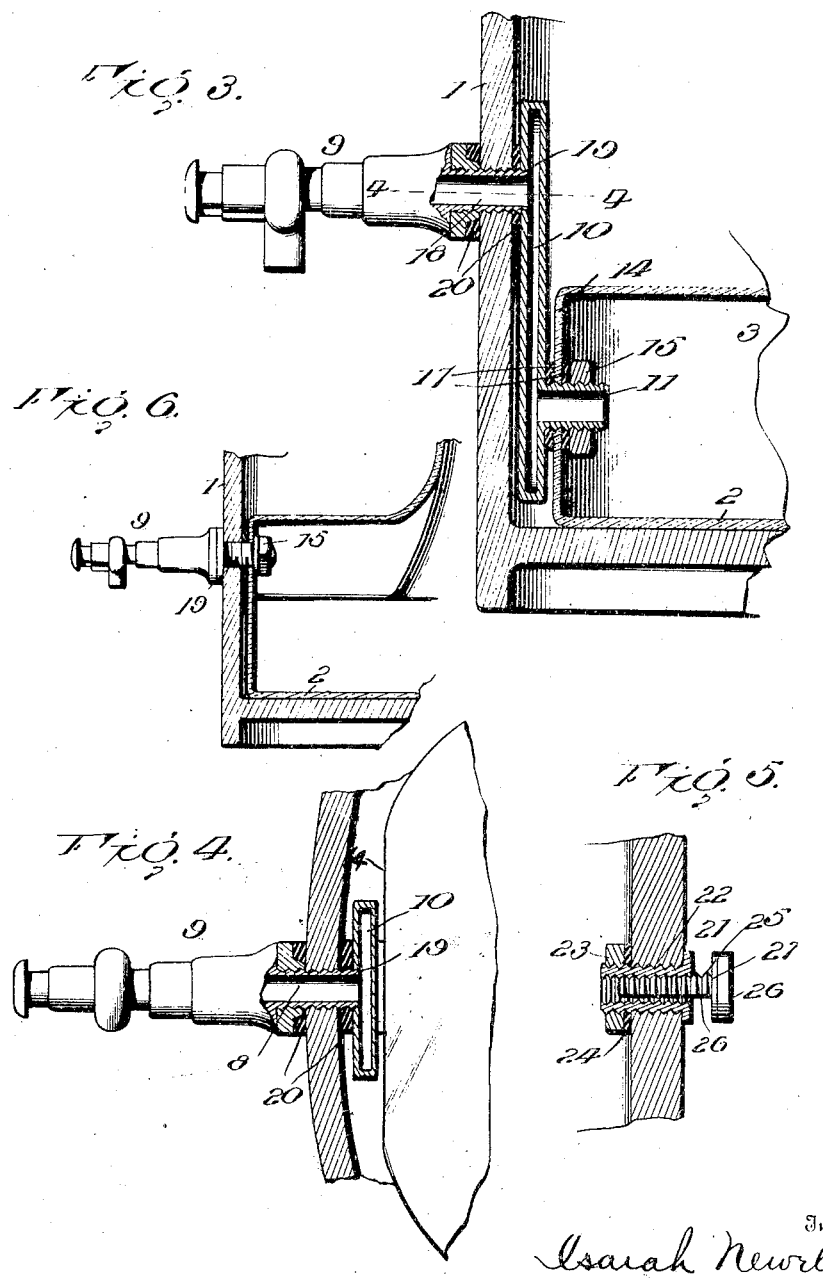

UNITED STATES PATENT OFFICE.

ISAIAH NEWELL, OF HAVERHILL, MASSACHUSETTS.

WATER-COOLER.

No. 895,782.  Specification of Letters Patent.  Patented Aug. 11, 1908.

Application filed September 26, 1903. Serial No. 174,784.

*To all whom it may concern:*

Be it known that I, ISAIAH NEWELL, a citizen of the United States, residing at Haverhill, in the county of Essex and State of Massachusetts, have invented new and useful Improvements in Water-Coolers, of which the following is a specification.

My invention relates to improvements in water coolers, and has for its object the producing of a cooler so constructed that water will be automatically delivered to the cooler from an original package of mineral or distilled water, as the cooled water is drawn therefrom, and without the mineral water, or distilled water coming in contact with the ice, thus absolutely avoiding any possible contamination of the pure water by contact with the ice.

Figure 1:
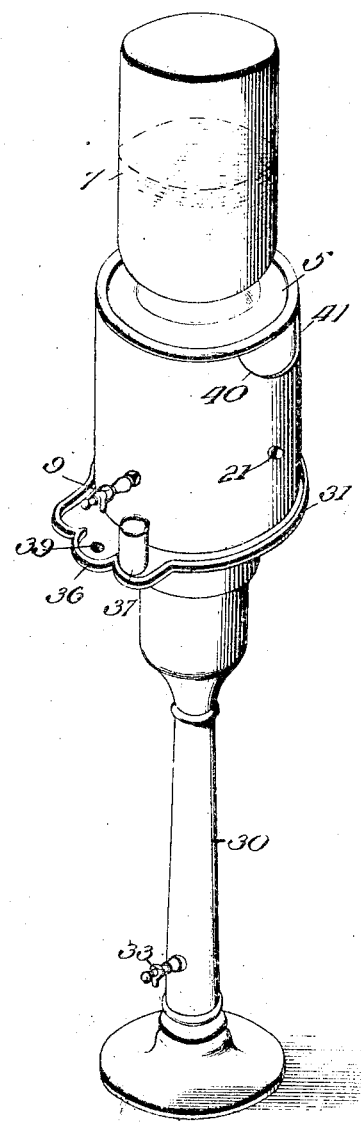
Figure 2:
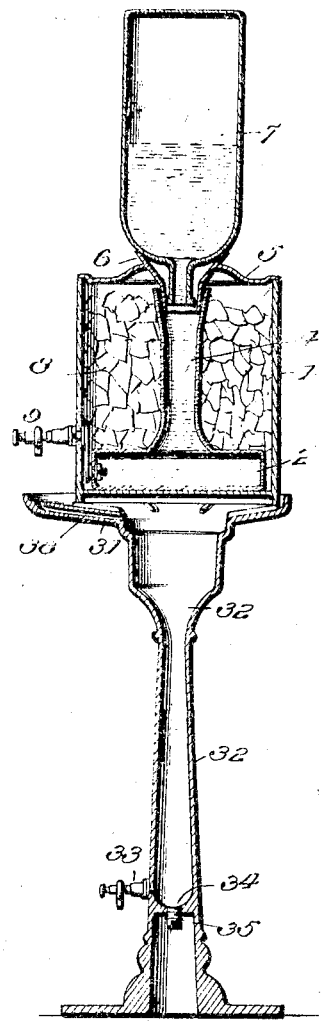

In the accompanying drawings, Figure 1, is a perspective view of my improved cooler, and its coöperating stand. Fig. 2, is a vertical central sectional view of Fig. 1. Fig. 3, is an enlarged sectional view through the lower end of the cooler showing the special manner of connecting the faucet with the receptacle which contains the pure water. Fig. 4, is a sectional view on the line 4—4 of Fig. 3. Fig. 5, is an enlarged sectional view showing my improved overflow device. Fig. 6, is a detached view of a portion of the enlarged lower end of the auxiliary vessel, showing a modified construction for the faucet or outlet connection.

In carrying out my invention, I provide a suitable receptacle or body portion 1 which may be made of any suitable material. Located within this receptacle is a water-containing vessel 2. This vessel 2 is principally composed of glass, as being the best suited for the purpose, and the particular formation of this vessel is one of the essential features of my present invention. It will be observed that this vessel 2 is constructed with a lower and large portion 3 which preferably almost fills the bottom portion of the main vessel 1. Projecting from the enlarged portion 3 is an elongated neck 4 forming a passage-way, and the upper end thereof is preferably about in the same horizontal plane as the top of the main vessel 1. For the purpose of facilitating the description, and for brevity in the claims, the vessel 1 will be hereafter referred to as the main vessel, and the vessel 2 as the auxiliary vessel.
The main vessel is provided with a cover 5 and this cover has a central opening provided with an upwardly-flaring flange or member 6 which projects above the top and preferably below the top, and into the mouth or upper end of the neck 4 of the auxiliary vessel, as clearly illustrated in Fig. 2. The flange 6 forms a support for the bottle 7 containing the pure water, and which is the original package. Placed within the main vessel 1 around the neck and upon the lower enlarged portion of the auxiliary vessel, is a suitable quantity of ice 8.

A suitable faucet 9 passes through the main vessel 1 and is in communication with the enlarged portion 3 of the auxiliary vessel in the following manner. A flat tube 10 is provided at its lower inner side with a laterally-projecting screw-threaded nozzle 11, and this nozzle projects through an opening 12 made in the side of the enlarged portion 3 of the auxiliary vessel. At this point the auxiliary vessel is made flat, as shown at 14, Fig. 4, for a purpose to be presently explained. Placed upon the inner end of the nozzle 11, is a clamping nut 15, and placed between the nut and the inner side of the auxiliary vessel, and between the outer side of the auxiliary vessel and the adjacent side of the tube 10, are the rubber or other suitable washers 17, by means of which a water-tight joint is made. The object in making the enlarged portion 3 of the auxiliary vessel flat, as shown at 14, is to enable the flat tube 10 to be turned around for tightening the nut 15 before the auxiliary vessel is placed in the main vessel, a suitably constructed wrench serving to hold the nut in position, the wrench passing through the neck portion of the auxiliary vessel. The inner end of the faucet 9 has a screw-threaded portion 18 which passes through the main vessel 1 and into a screw-threaded opening 19 in the upper portion of the flat tube 10. A tight joint is effected through the medium of suitable rubber washers 20.

When it is desired to prevent the accumulation of water in the lower portion of the main vessel, owing to the melting of the ice, and thus keep the water at a predetermined point, and thus to a certain extent prevent the melting of the ice, I provide an overflow device 21, which consists of a tube 22 which passes through the main body portion and is screw-threaded to receive a nut 23 on its inner end. Placed between the nut and the wall of the main vessel, is a suitable washer 24 to effect a water-tight joint, as will be readily understood from Fig. 5. This tube 22 is internally screw-threaded, and receives a screw-threaded stem 25, which is provided with a suitable head 26. The stem 25 is flattened throughout its length as shown at 26, or otherwise equivalently constructed to form an outlet passage-way when the head 26 is not in engagement with the outer end of the tube 22. In order to form a water-tight joint when it is desired to close the overflow passage-way, I provide a rubber washer 27, so that by turning the stem to cause the head 26 to clamp the washer against the outer end of the tube 22, a water-tight joint is made, and the overflow vent is closed. The object of this overflow is to prevent an accumulation of water in the main vessel, and to provide means whereby the main vessel is placed upon a suitable stand, tray, or in a sink, the overflow will pass down the outer wall of the main vessel into the tray, stand, or sink, and thus automatically provide an overflow for the main vessel.

I have provided a suitable stand, so constructed as to receive the overflow and from which it may be drawn from time to time, or the stand may be connected with a tube to convey the overflow to a sewer or other suitable outlet. This stand consists of a suitable stem or standard portion 30 having at its upper end what may be termed a tray 31, and this tray communicates with the interior or hollow portion 32 of the standard 30. The tray is larger than the main vessel 1, so that the overflow passing down the outer wall thereof, will be caught by the tray and conveyed into the standard 30. When the standard is to be used as a receiver for the overflow, I provide a faucet 33 by means of which the water may be drawn therefrom from time to time. To enable the overflow to be connected with a sewer or other suitable outlet, I provide the lower end of the standard 30 with an opening 34, adapted to receive a pipe (not here shown) and this opening is closed by a suitable plug 35 when the faucet 33 is to be used for drawing the water from the hollow standard. The tray is provided with a suitable projecting portion 36 to form a rest for a glass 37, and this extended portion communicates with the standard 30 through a suitable passage way 38, the upper end of the passage-way 39 forming an opening, as shown in Fig. 4, which is directly located under the outlet of the faucet 9, so that any drip from the faucet will pass into the opening and thus prevent any splashing of the drip, which would otherwise occur.

The object in providing the upwardly-extending tube-portion 10, is to enable the faucet 9 to be located at a point sufficiently above the lower end of the main vessel to enable a glass to be placed thereon.

It will be noted from Fig. 2, that the mouth of the bottle 7 projects into the upper end of the neck 4 of the auxiliary vessel, the object of which is to cause the water in the neck of the vessel to form an automatic cut off for the water in the bottle. When water is drawn from the faucet 9, the level of the water in the neck 4 is lowered and permits the same quantity to flow from the bottle that was withdrawn through the faucet 9. The auxiliary vessel is preferably made of a size sufficient to prevent the appreciable rising of the temperature of the water in the auxiliary vessel when a glass is drawn therefrom, owing to the passage of the warmer water from the bottle 7.

To prevent necessity of removing the cover 5 from the main vessel, and therefore the necessity of removing the bottle 7, to place ice in the main vessel, I provide the upper portion of the main vessel with a cut-out portion 40 adapted to receive the ice therethrough, and this cut-out portion 40 is closed by a correspondingly shaped member 41.

The great advantage of a cooler of this character is, to enable water to be received from an original package, and which indicates to the user that he is drinking pure water from the original package, and which will also indicate when the water is exhausted from the original package, thus requiring the removal thereof and the substitution thereof of a filled bottle. The flange 6 serves as a support for the original package, and also serves as a funnel to prevent the spilling of any water from the original package as it is being placed in position. It is found in practice that the stopper can be withdrawn from an original package, and the bottle placed in position, without any spilling of the water out of the flange 6.

When desired, the auxiliary vessel can be removed from the main vessel, by unscrewing the faucet 9, for the purpose of being examined, to see whether it needs cleaning and to also enable it to be readily cleansed. However, since mineral or distilled water is being used, and a tight joint being formed between the original package and the neck of the auxiliary vessel, there will be little if any occasion for the removal of the auxiliary vessel.

In Fig. 6, I show a modified manner of connecting the faucet or outlet to the enlarged lower end of the auxiliary vessel, which consists in forming an enlargement 45 into which the inner end of the faucet 9 will pass, as there illustrated, in which event, the hollow member 10 is omitted.

While I have described my invention to be used as a water cooler, it will be readily understood that it may be used for the purpose of cooling other liquids.

Having thus described my invention, what I claim as new, and desire to secure by Letters Patent, is:—

1 A cooler comprising a main vessel, an auxiliary vessel placed therein and of a smaller area than the main vessel to permit ice to be placed therearound, the auxiliary vessel extending to the upper portion of the main vessel and adapted to receive the mouth of the bottle, a support for the bottle arranged exterior in respect to the main vessel, and an outlet connection connected with the lower portion of the auxiliary vessel and passing through the main vessel.

2. A cooler of the character described, comprising a main vessel, an auxiliary vessel placed therein, the auxiliary vessel having an enlarged lower portion and an upwardly-extending reduced portion projecting to approximately the upper end of the main vessel and adapted to receive the mouth of the bottle, a cover for the main vessel having an opening in communication with the upper end of the said reduced portion and carrying a bottle-support, and an outlet connection communicating with the said enlarged portion and passing through the main vessel.

3. A cooler of the character described, comprising a main vessel, an auxiliary vessel placed therein and smaller in cross-sectional area than the main vessel, the auxiliary vessel having a portion extending to the upper portion of the main vessel and adapted to receive the mouth of a bottle, a bottle support arranged exterior the main vessel and in communication with the upper portion of the auxiliary vessel, and an outlet connection communicating with the lower portion of the auxiliary vessel and passing through the main vessel.

4. A cooler of the character described, including a main vessel, an auxiliary vessel placed therein and of a smaller cross-sectional area than the main vessel and provided with a portion extending to the upper portion of the main vessel and adapted to receive the mouth of a bottle, and a combined funnel and bottle support arranged in a line with the upper portion of the auxiliary vessel, and an outlet connection communicating with the lower portion of the auxiliary vessel and passing through the main vessel.

5. A cooler of the character described, including a main vessel, an auxiliary vessel therein and having an enlarged lower portion and a reduced upwardly extending portion adapted to receive the mouth of a bottle, a bottle support and an outlet connection consisting of a hollow member having its lower end connected with the said enlarged portion of the auxiliary vessel, and a faucet passing through the main vessel and communicating with the upper portion of the said hollow member.

6. A cooler of the character described, including a main vessel, an auxiliary vessel therein and having an enlarged lower portion and an upwardly extending reduced portion adapted to receive the mouth of a bottle, a bottle support, and an outlet connection consisting of a vertically arranged hollow member having at its lower end an externally screw-threaded nozzle passing through the said enlarged portion of the auxiliary vessel, yielding washers and a nut placed upon the said nozzle for making a water-tight joint, and a faucet passing through the main vessel and connected with the upper portion of the said hollow member.

7. A cooler comprising a main vessel, an auxiliary vessel placed therein and of a smaller area than the main vessel to permit ice to be placed therearound, the auxiliary vessel extending to the upper portion of the main vessel, and adapted to receive the mouth of a supported bottle, an outlet connection connected with the lower portion of the auxiliary vessel and passing through the main vessel, an ice inlet at the upper portion of the main vessel and in communication with the ice space, and a closure for said ice inlet.

In testimony whereof I have hereunto set my hand in the presence of two subscribing witnesses.

ISAIAH NEWELL.

Witnesses:
WILLIAM A. TURNER,
DORA M. NEWELL.